United States Patent [19]
Negus

[11] Patent Number: 5,249,923
[45] Date of Patent: Oct. 5, 1993

[54] WATER ACTUATED OUTDOOR FAN

[76] Inventor: James S. Negus, 3404 NE. 49th Ave., Portland, Oreg. 97213

[21] Appl. No.: 857,651

[22] Filed: Mar. 26, 1992

[51] Int. Cl.$^5$ .................................................. F01D 9/00
[52] U.S. Cl. ........................................ 415/202; 415/51;
415/182.1; 415/203; 415/208.1; 415/213.1;
415/228; 239/70; 248/156; 248/188.5; 248/508;
248/545; 403/104; 403/109
[58] Field of Search ........................... 415/51, 80–82,
415/182.1, 183, 202, 203, 213.1, 228, 200, 208.1;
239/70, 77, 78; 248/156, 188.5, 508, 545;
403/104, 109; 416/100; 417/65, 66

[56] References Cited

U.S. PATENT DOCUMENTS

| | | | |
|---|---|---|---|
| 537,087 | 4/1895 | Travis | 415/202 |
| 565,772 | 8/1896 | Mingle et al. | 415/202 |
| 652,719 | 6/1900 | Mayer | 415/202 |
| 1,301,056 | 4/1919 | Hurtt et al. | 415/202 |
| 1,782,660 | 11/1930 | Meyer | 403/109 |
| 1,915,628 | 6/1933 | Thalhammer | 248/188.5 |
| 3,314,191 | 4/1967 | Darr | 415/202 |
| 3,473,770 | 10/1969 | Edgerton | 248/156 |
| 3,865,138 | 2/1975 | Jones | 239/70 |
| 4,130,135 | 12/1978 | Moore | 239/70 |
| 4,744,515 | 5/1988 | Watanabe | 239/70 |
| 5,135,191 | 8/1992 | Schmuhl | 403/109 |

FOREIGN PATENT DOCUMENTS 2068447. 8/1981 United Kingdom ............... 403/104

*Primary Examiner*—Edward K. Look
*Assistant Examiner*—Christopher Verdier
*Attorney, Agent, or Firm*—Michael I. Kroll

[57] ABSTRACT

A water actuated outdoor fan which includes a plurality of radiating blades for creating a current of air, and a water turbine for converting the kinetic energy of moving water to mechanical power to operate the plurality of radiating blades.

12 Claims, 2 Drawing Sheets

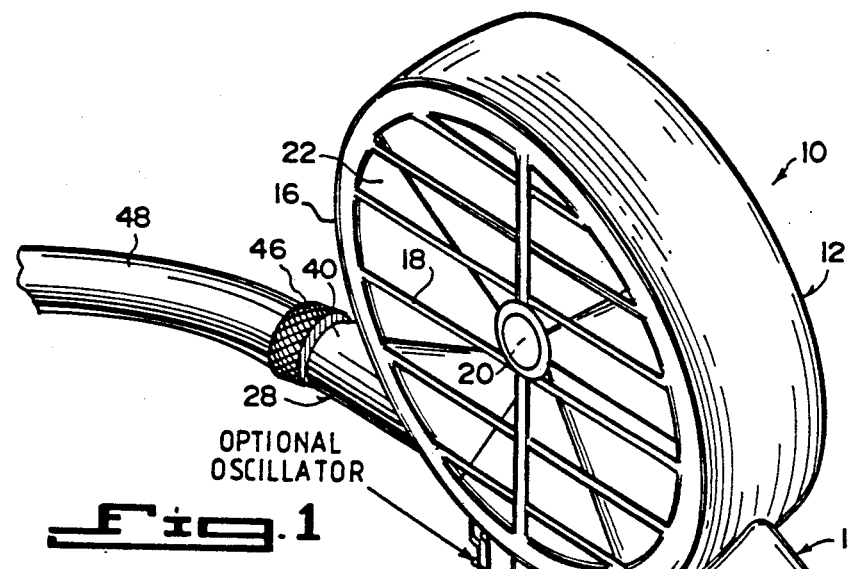
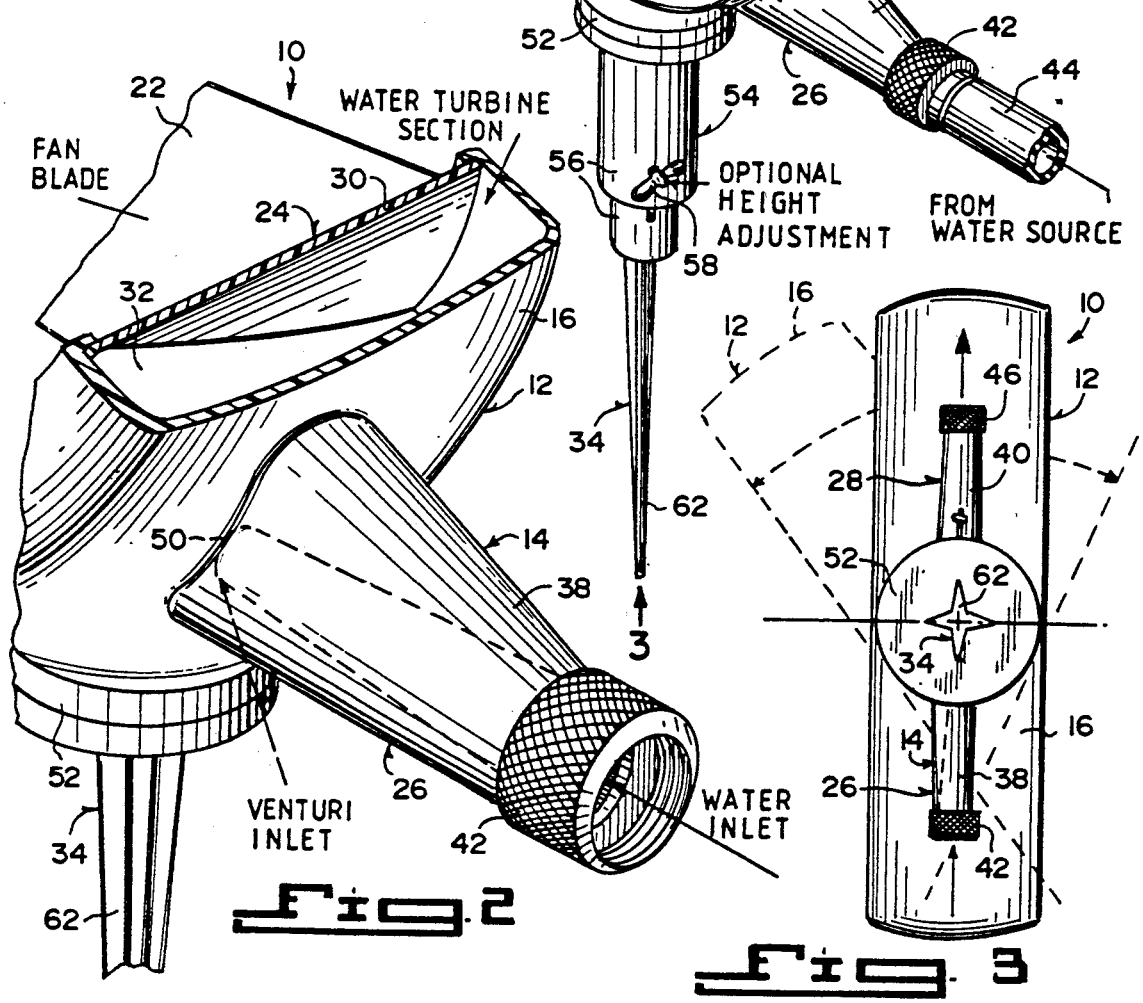

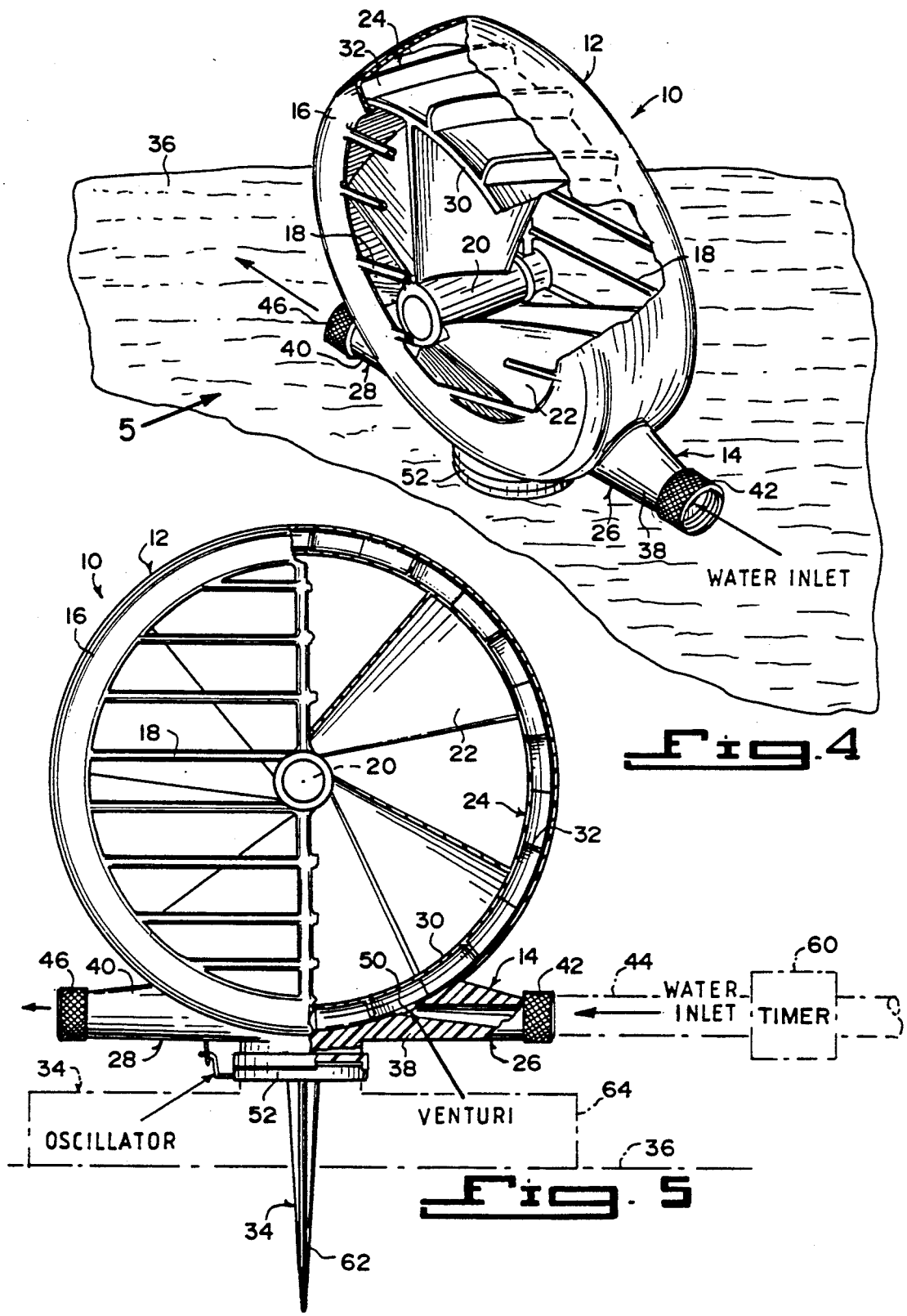

WATER ACTUATED OUTDOOR FAN

BACKGROUND OF THE INVENTION

1. Field of the Invention

The instant invention relates generally to fans and more specifically it relates to a water actuated outdoor fan.

2. Description of the Prior Art

Numerous fans have been provided in prior art that are adapted to use electric motors to rotate thin rigid blades in order to create a current of air for cooling. While these units may be suitable for the particular purpose to which they address, they would not be as suitable for the purposes of the present invention as heretofore described.

SUMMARY OF THE INVENTION

A primary object of the present invention is to provide a water actuated outdoor fan that will overcome the shortcomings of the prior art devices.

Another object is to provide a water actuated outdoor fan that utilizes water pressure from a garden hose to drive the blades of the fan safely instead of electricity which can cause injury or death.

An additional object is to provide a water actuated outdoor fan that contains a venturi inlet tube which will increase the water pressure coming from the garden hose to make the blades of the fan rotate faster for increasing the air movement created by the fan.

A further object is to provide a water actuated outdoor fan that is simple and easy to use.

A still further object is to provide a water actuated outdoor fan that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention, showing an optional oscillator unit and height adjustment structure thereon.

FIG. 2 is an enlarged perspective view of a portion of the instant invention showing the inlet conduit in greater detail.

FIG. 3 is a bottom view taken in direction of arrow 3 in FIG. 1.

FIG. 4 is a perspective view with parts broken away showing the spike base inserted into the ground.

FIG. 5 is a front view with parts broken away taken in the direction of arrow 5 in FIG. 4.

DETAILED DESCRIPTION OF THE PREFERRED EMBODIMENTS

Turning now descriptively to the drawings, in which similar reference characters denote similar elements throughout the several views, the Figures illustrate a water actuated outdoor fan 10 which consists of a mechanism 12 for creating a current of air and a structure 14 for converting the kinetic energy of moving water to mechanical power to operate the air current creating mechanism 12.

The air current creating mechanism 12 includes a housing 16, a pair of grilles 18 mounted on opposite sides of the housing 16, a shaft 20 which revolves between the pair of grilles 18 and a plurality of radiating blades 22 mounted on the shaft 20. When the shaft 20 revolves between the pair of grilles 18 the radiating blades 22 will move the air past the pair of grilles 18.

The water converting structure 14 includes a water turbine 24 located within the housing 16 about the radiating blades 22. A first conduit 26 is for conveying water to the water turbine 24. A second conduit 28 is for conveying water away from the water turbine 24.

The water turbine 24 contains a wheel 30 connected about the distal ends of the radiating blades 22. A plurality of vanes 32 are arrayed about the circumference of the wheel 30. The section of the water with the vanes 32 will revolve the wheel 30 which will also revolve the radiating blades 22.

The housing 16 includes an apparatus 34 for securing the housing 16 to the ground 36 in a stationary manner. The first water conveying conduit 26 is a water inlet tube 38 fluidly connected to the housing 16, so that the incoming water can react with the vanes 32 of the water turbine 24. The second water conveying tube 28 is a water outlet tube 40 fluidly connected to the housing 16, so that the outgoing water from the vanes 32 can exit therefrom.

A first connector member 42 is affixed to the water inlet tube 38, so that the water inlet tube 38 can engage with a first garden hose 44 that carries the water from a water source (not shown). A second connector member 46 is affixed to the water outlet tube 40, so that the water outlet tube 40 can engage with a second garden hose 48 that carries the water away.

The water inlet tube 38 has a venturi 50 that is a constricted throat which compresses the pressure of the flow of the incoming water to vanes 32 of the water turbine 34. This enhances the velocity of the water to increase rotation of the wheel 30 and thereby enhances the rotation of the radiating blades 22, which will move the air faster past the pair of grilles 18.

The water actuated outdoor fan 10 can further includes an oscillator unit to cause the housing 16 to swivel back and fourth on the housing securing apparatus 34 to disperse the air current over a greater area.

As shown in FIG. 1, a device 5 is for adjusting the height of the housing 16 with respect to the housing securing apparatus 34. The height adjusting device 54 includes a pair of telescoping stanchions 56 mounted between the housing 16 and the housing securing apparatus 34. A set screw 58 is provided which extends into the telescoping stanchions 56 for locking the stanchions together.

The housing securing apparatus 34 is an elongated spike 62 which can be inserted into the ground 36. The housing securing apparatus 34 can also be a weighted base stand 64, shown in phantom in FIG. 5, which can be placed upon the ground 36.

The water actuated outdoor fan 10 is fabricated out of a durable strong waterproof material, typically but not limited to plastic, aluminum, steel and the like. A timer 60, as shown in phantom in FIG. 5, can be fluidly connected to the first garden hose 26, so that the timer 60 can be set to control the flow of water coming from the water source through the first garden hose 26 into the water inlet tube 38.

LIST OF REFERENCE NUMBERS

10: water actuated outdoor fan
12: air current creating mechanism
14: water converting structure
16: housing
18: grille on 16
20: shaft
22: radiating blade on 20
24: water turbine
26: first water conveying conduit
28: second water conveying conduit
30: wheel
32: vane
34: housing securing apparatus
36: ground
38: water inlet tube for 26
40: water outlet tube for 28
42: first connector member
44: first garden hose
46: second connector member
48: second garden hose
50: venturi
52: oscillator unit
54: height adjusting device
56: telescoping stanchions
58: set screw
60: timer
62: elongated spike for 34
64: weighted base stand for 34

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the ar without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A water actuated outdoor fan which comprises: means for creating a current of air, a housing, a pair of grilles mounted on opposite sides of said housing, a shaft which revolves between said pair of grilles, a plurality of radiating blades mounted on said shaft, so that when said shaft revolves between said pair of grilles said radiating blades will move the air past said pair of grilles, a water turbines located within said housing around said radiating blades, said water turbine includes a wheel connected about the distal ends of said radiating blades and a plurality of vanes arrayed about circumference of said wheel, so that the reaction of water with said vanes will revolve said wheel which will also revolve said radiating vanes because said vanes, said wheel, and said radiating vanes are coplanar are coplaner and their central shafts are colinear and they are free of pulleys and belts, means for conveying water to said water turbine and containing a venturi tube to increase water pressure, means for conveying water away from said water turbine and being colinear with said means for conveying water to said water turbine and being disposed on bottom of said housing.

2. A water actuated outdoor fan as recited in claim 1, wherein said housing includes means for securing said housing to the ground in a stationary manner.

3. A water actuated outdoor fan as recited in claim 2, wherein said means for conveying water to said water turbine includes a water inlet tube fluidly connected to said housing, so that the incoming water can react with said vanes of said water turbine.

4. A water actuated outdoor fan as recited in claim 3, wherein said means for conveying water away from said water turbine includes a water outlet tube fluidly connected to said housing, so that the outgoing water from said vanes can exit therefrom.

5. A water actuated outdoor fan as recited in claim 4, further including:
   a) a first connector member affixed to said water inlet tube, so that said water inlet tube can engage with a first garden hose that carries the water from a water source; and
   b) a second connector member affixed to said water outlet tube, so that said water outlet tube can engage with a second garden hose that carries the water away.

6. A water actuated outdoor fan as recited in claim 5, wherein said water inlet tube venturi is a constricted throat which enhance the pressure of the flow of the incoming water to said vanes of said water turbine to enhance the velocity of the water to increase rotation of said wheel and thereby enhances the rotation of said radiating blades, which will move more past said pair of grilles.

7. A water actuated outdoor fan as recited in claim 6, further including means for adjusting the height of said housing with respect to said housing securing means.

8. A water actuated outdoor fan as recited in claim 7, wherein said height adjusting means includes:
   a) a pair of telescoping stanchions mounted between said housing and said housing securing means; and
   b) a set screw which extends into said telescoping stanchions for locking said stanchions together once a desired height has been achieved.

9. A water actuated outdoor fan as recited in claim 8 is fabricated out of a durable strong waterproof material, such as plastic, aluminum, or steel.

10. A water actuated outdoor fan as recited in claim 9, further including a timer fluidly connected to the first garden hose, so that said timer can be set to control the flow of water coming from the water source through the first garden hose into said water inlet tube.

11. A water actuated outdoor fan as recited in claim 10, wherein said housing securing means is an elongated spike which can be inserted into the ground.

12. A water actuated outdoor fan as recited in claim 10 wherein said housing securing means is a weighted base stand which can be placed upon the ground.

* * * * *